W. M. King.
Milk Cooler.
N° 87,265. Patented Feb. 23, 1869.
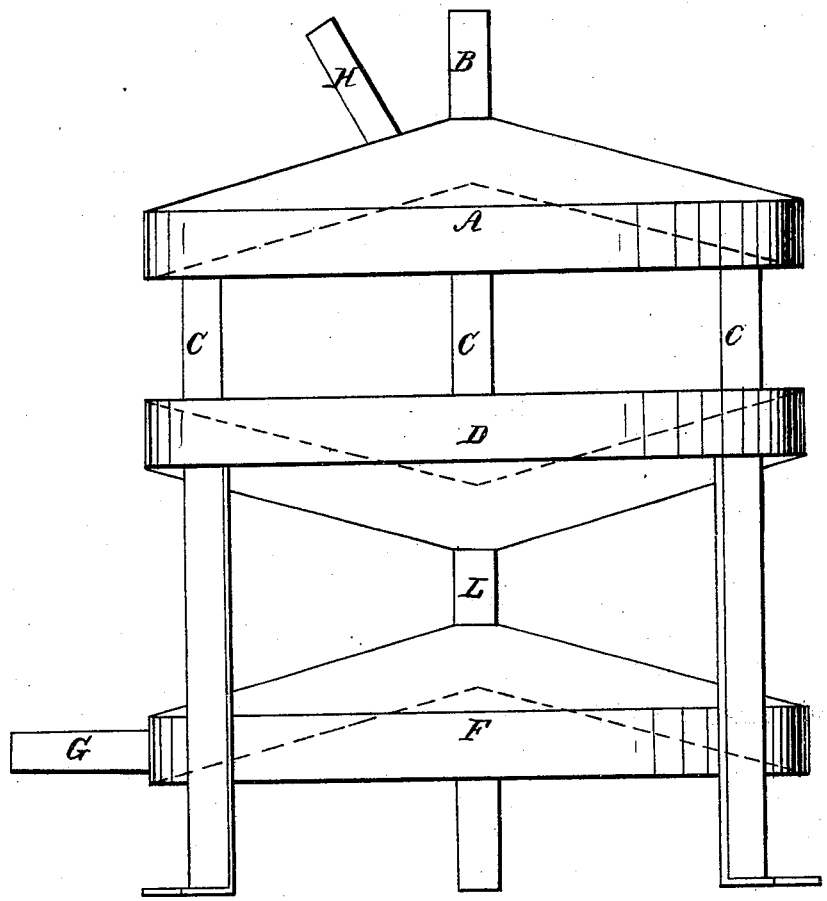
Witnesses;
Leopold Evert
A. A. Yeatman
Inventor;
W. M. King
per Alexander & Mason
Attys.

WILLIAM M. KING, OF MORRISON, ILLINOIS.

Letters Patent No. 87,265, dated February 23, 1869.

IMPROVEMENT IN MILK-COOLERS.

The Schedule referred to in these Letters Patent and making part of the same.

*To all whom it may concern:*

Be it known that I, WILLIAM M. KING, of Morrison, in the county of Whitesides, and in the State of Illinois, have invented certain new and useful Improvements in Milk-Coolers; and do hereby declare that the following is a full, clear, and exact description thereof, reference being had to the accompanying drawings, and to the letters of reference marked thereon.

The nature of my invention consists in the construction and arrangement of a series of concave and convex pans, placed one above the other, in such a manner that the milk will pass from one to the other, alternating from centre to circumference, and from circumference to centre, thereby cooling very quick.

In order to enable others skilled in the art to which my invention appertains, to make and use the same, I will now proceed to describe its construction and operation, referring to the annexed drawings, which form a part of this specification, and which represent a side elevation of my invention.

A represents a circular pan, cone-shaped, with the convex side up.

At the centre of the top of this pan is a tube, B, through which the milk is poured in.

The milk, of course, runs downward to the circumference of the pan A, where tubes C C connect with the outer edges of a similar pan, D, placed under the former, with the concave side up.

In the pan D, the milk runs to the centre, where a tube, E, leads into the centre of still another pan, F, similar to and placed like the first pan A.

At the edge of this pan is a tube, G, to which a faucet may be attached to let the milk out.

In the upper pan A, is another tube, H, for the purpose of admitting air, and letting the hot air from the milk escape.

Any number of pans placed as above described, may be used, allowing the milk to alternate from the centre to the circumference in one, and from the circumference to the centre in the next, and so on.

The pans may be made of any material desired, and of any shape, round, oval, square, or in any mode deemed most convenient.

Having thus fully described my invention,

What I claim as new, and desire to secure by Letters Patent, is—

A milk-cooler, consisting of concave and convex pans connected by tubes, and placed one above the other, as described, for the purpose of allowing the milk to pass alternately from the centre to the circumference, and from the circumference to the centre, substantially as and for the purposes herein set forth.

In testimony that I claim the foregoing, I have hereunto set my hand, this 18th day of August, 1868.

WM. M. KING.

Witnesses:
   GEO. H. FAY,
   F. D. RAMSAY.